United States Patent
Castellan et al.

(10) Patent No.: US 8,853,615 B2
(45) Date of Patent: Oct. 7, 2014

(54) ULTRAVIOLET RADIATION MEASUREMENT SENSOR

(75) Inventors: Julia Castellan, Trets (FR); Philippe Boivin, Venelles (FR)

(73) Assignee: STMicroelectronics (Rousset) SAS, Rousset (FR)

(*) Notice: Subject to any disclaimer, the term of this patent is extended or adjusted under 35 U.S.C. 154(b) by 91 days.

(21) Appl. No.: 13/552,787

(22) Filed: Jul. 19, 2012

(65) Prior Publication Data

US 2013/0020477 A1 Jan. 24, 2013

(30) Foreign Application Priority Data

Jul. 21, 2011 (FR) ..................................... 11 56607

(51) Int. Cl.
*G01J 1/44* (2006.01)
*G01J 1/42* (2006.01)

(52) U.S. Cl.
CPC .............. *G01J 1/4228* (2013.01); *G01J 1/429* (2013.01); *G01J 1/44* (2013.01)
USPC .................................. 250/252.1; 250/370.07

(58) Field of Classification Search
CPC ............ G01J 1/42; G01J 1/429; G01N 21/33; H01L 31/109
USPC ........................................................ 250/372
See application file for complete search history.

(56) References Cited

U.S. PATENT DOCUMENTS

| | | | |
|---|---|---|---|
| 6,970,386 B2* | 11/2005 | Hollmer | 365/185.32 |
| 2006/0279339 A1* | 12/2006 | Rebholz-Goldmann | 327/108 |
| 2009/0268031 A1* | 10/2009 | Honma et al. | 348/162 |
| 2011/0101348 A1* | 5/2011 | Tokashiki | 257/48 |
| 2011/0133182 A1* | 6/2011 | Saito et al. | 257/43 |

FOREIGN PATENT DOCUMENTS

| | | |
|---|---|---|
| FR | 2911191 | 7/2008 |
| JP | 57040619 | 3/1982 |

* cited by examiner

*Primary Examiner* — Marcus Taningco
(74) *Attorney, Agent, or Firm* — Allen, Dyer, Doppelt, Milbrath & Gilchrist, P.A.

(57) ABSTRACT

A method for measuring radiation of energy photons, such as ultraviolet radiation, on a surface, may include programming at least one transistor by at least transmitting an electric charge to it. The method may further include measuring an electrical quantity of the at least one transistor receiving radiation of energy photons and estimating, based on this electrical quantity, an amount of radiation received.

39 Claims, 3 Drawing Sheets

ULTRAVIOLET RADIATION MEASUREMENT SENSOR

FIELD OF THE INVENTION

The present invention relates to a sensor for measuring light, and, more particularly, an ultraviolet (UV) sensor, or more generally a sensor of radiation of energy photons with a short wavelength. The present invention also relates to a method for measuring such radiation of energy photons. Finally, the present invention also relates to a device or system comprising such a measurement sensor.

BACKGROUND OF THE INVENTION

A first state of the art device for measuring an amount of light received is a photodiode-based sensor. Since the latter can produce a current proportional to the light intensity received, information concerning the light received can be deduced therefrom. The use of a photodiode makes it possible to obtain accurate results but presents the drawback of high cost. A second drawback is that it may not supply a measurement of an aggregate of light received over a certain period.

A second state of the art technique exploits the chemical property of certain polymers which react to light by changing color. Their use makes it possible to obtain information on the light received but, however, presents the drawback of great inaccuracy.

Finally, existing approaches for measuring the light received remain inadequate, and there is therefore a desire for an improved approach for measuring light which makes it possible to offer an accurate measurement for a reduced cost.

SUMMARY OF THE INVENTION

To this end, an embodiment of the present invention is directed to a method for measuring radiation of energy photons, such as ultraviolet radiation, on a certain surface. The method includes the steps of programming of at least one transistor by at least transmitting an electric charge to it. The method also includes a measurement of an electrical quantity of the at least one transistor receiving a radiation of energy photons and an estimation based on this measured electrical quantity of the amount of radiation received.

The step for measuring an electrical quantity may comprise the measurement of the threshold voltage or of the current of the at least one transistor. The preceding steps may be implemented from a number of transistors arranged according to a non-volatile electronic memory structure. Thus, the preceding steps may be implemented from a number of transistors $C_j$ arranged in m lines and n columns. Each transistor $C_{ij}$ is located at the intersection of a word line $WL_i$ and of a bit line $BL_j$, and has its gate G connected to the word line $WL_1$ and its drain D connected to the bit line $BL_j$, so that their programming and/or electrical quantity measurement comprises the application of a voltage to the gate G of the transistors via the word lines.

The programming step may comprise the programming of all the transistors intended to receive the radiation. The measurement method may comprise a step for estimating the number of transistors in the unprogrammed state or in a predefined intermediate state of loss of charge to deduce therefrom, an estimation of the amount of radiation received.

The measurement method may comprise an estimation of the shift in the statistical distribution of the threshold voltages of the transistors to deduce therefrom an estimation of the amount of radiation received. The measurement method may comprise a preliminary calibration step.

The measurement method may comprise a step for erasing or clearing all the transistors intended to receive radiation including removing from them, an electric charge before recommencing a new estimation of the amount of radiation received. The measurement method may comprise a step for indicating the estimation of the amount of radiation received via a human-machine interface.

This indication step may comprise a visual display or a sound emission. The indication step may also comprise an indication that the amount of radiation received exceeds a predefined threshold or may comprise the indication of several levels of amount of radiation received.

Another embodiment is directed to a sensor for measuring a radiation of energy photons, such as ultraviolet radiation. The sensor comprises at least one transistor arranged under at least one window that is transparent to the radiation so as to be able to receive radiation. The sensor also comprises a device for measuring the radiation received on a certain surface which implements the measurement method as described previously.

The measurement sensor may take the form of an integrated circuit comprising a transparent window. The measurement sensor may comprise a number of transistors arranged according to a non-volatile memory structure. Thus, it may comprise a number of transistors $C_{ij}$ arranged in m lines and n columns. Each transistor $C_{ij}$ is located at the intersection of a word line $WL_i$ and of a bit line $BL_j$ and has its gate G connected to the word line $WL_i$ and its drain D connected to the bit line $BL_j$ so that their programming and/or electrical quantity measurement comprises the application of a voltage to the gate G of the transistors via the word lines.

The measurement sensor may comprise a device for programming and/or reading and/or erasing or clearing the at least one transistor. The measurement sensor may comprise at least one transistor with a floating gate and being programmed by an injection of hot carriers arranged under a window that is transparent to the radiation.

The measurement sensor may comprise a human-machine interface to indicate the estimation of the amount of radiation received. The measurement sensor may comprise a contact-based or contactless communication device and/or a solar electric power supply and/or an electronic memory.

Another embodiment also relates to a device sensitive to radiation of energy photons, such as ultraviolet radiation. The device comprises a measurement sensor as described previously. This sensitive device may be a tube of sunscreen and the measurement sensor may be fixed onto its outer surface.

Another embodiment relates to a system that comprises a measurement sensor as described previously. The system has a reader capable of exchanging data with the measurement sensor.

DETAILED DESCRIPTION OF THE PREFERRED EMBODIMENTS

According to one embodiment, a choice is made to fabricate a sensor for measuring light, and more specifically, type A, B, or C ultraviolet light present in natural light, using a semiconductor component. The sensor comprises a set of transistors organized according to a structure close to that of a non-volatile memory. This use of an integrated circuit makes it possible to form a small and inexpensive sensor. As a variant, such a sensor may be used to measure any radiation of energy photons, such as, ultraviolet radiation or radiation with any other lower wavelength. The simpler and more general term of "light sensor" will be used hereinafter.

Figure 1:
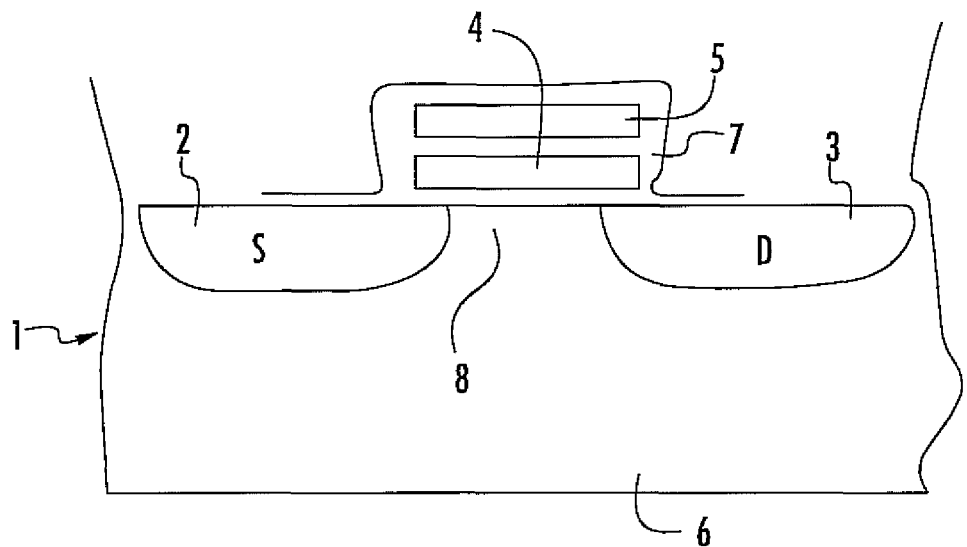
FIG. 1 is a cross-section of a transistor in according to a prior art.

FIG. 1 is a cross-sectional view of a conventional structure of a MOS transistor 1. This transistor 1 comprises a P-type substrate 6, N-type source (S) and drain (D) regions 2, 3, a floating gate 4, and a control gate 5. The floating gate and the control gate are generally made of polysilicon (polycrystalline silicon). The control gate, and the source and drain regions are provided with electric contacts, which are not represented. The floating gate 4 is electrically insulated from the substrate 6 and from the control gate 5 by a dielectric material 7.

Figure 2:
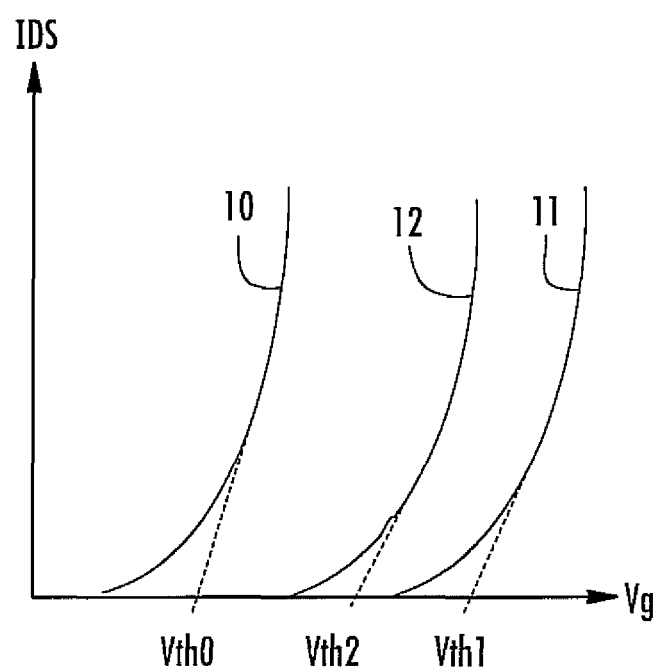
FIG. 2 is a graph of current as a function of the gate voltage of the transistor of FIG. 1.

A programming operation is performed on the transistor 1 by applying a positive voltage $V_D$ to the drain region 3, a positive voltage $V_G$ to the control gate 5, and a zero voltage $V_S$ (ground or GND) to the source region 2. These voltages, schematically represented in FIG. 2, are chosen so as to place the transistor in a saturated operating mode. The gate voltage $V_G$, above a threshold voltage $V_{th}$, reveals a vertical electric field, which reveals, in the substrate 1, a zone in which electrons can circulate. The drain-source potential difference reveals a current IDS between the drain region 3 and the source region 2, in a zone that is called a channel 8, corresponding to a flow of electrons circulating in the reverse direction between the source region 2 and the drain region 3. These electrons acquire a significant kinetic energy which enables a small portion of them to cross the potential barrier of the dielectric material 7 and penetrate into the floating gate 4, where they remain trapped.

The electric charges trapped in the floating gate 4 modify the threshold voltage of the transistor. This threshold voltage can then be measured by a read amplifier, the output of which supplies a logic value, 1 or 0, depending on whether the transistor is in the programmed state, that is to say, electrically charged, or not (the non-programmed state also being called erased state). FIG. 2 illustrates two curves 10, 11 of the trend of the current IDS as a function of the gate voltage $V_g$ applied to the transistor, respectively in the case of a non-programmed transistor and in the case of a programmed transistor. A difference in threshold voltage $V_{th0}$ and $V_{th1}$ clearly appears between the two states.

A read operation on the transistor makes it possible to easily deduce therefrom the binary state, programmed or not, of the transistor, or even a so-called "loss of charge" intermediate state. For this, an appropriate read voltage is applied to it, and the result of this is an electric current or a voltage which depends on its programming state. By measuring this current or this voltage, a determination can be made as to whether the transistor has or has not been programmed. More specifically, reading the state of the transistor entails making a comparison between the current from the transistor concerned and a reference current value. The reference current value is chosen to be substantially in the middle of the range between the current value that a programmed transistor would supply (value close to zero in practice) and the current value that a non-programmed transistor would supply, this programmed transistor and this non-programmed transistor receiving the same read voltages.

Under the effect of an emission of radiation of energy photons, such as ultraviolet radiation, beyond a certain time, the electrons trapped in the floating gate of the transistor receive sufficient energy to escape to the substrate 6 or to the control gate 5, which causes the threshold voltage of the transistor to be modified. This modification can be detected by a read operation described above. To this end, the curve 12 of the graph of FIG. 2 represents the trend of the current IDS as a function of the gate voltage $V_g$ applied to a transistor that has been subjected to a UV radiation from a programmed state, and that has lost some of its electrons following this radiation, and which is in an intermediate state between the two extreme programmed and non-programmed states. In this intermediate state, the transistor exhibits a threshold voltage $V_{th2}$ of between $V_{th0}$ and $V_{th1}$.

The phenomenon described above therefore makes it possible to implement a sensor for measuring UV radiation or, more simply, a sensor for measuring light from a transistor, since this radiation has a detectable effect on the electrical behavior of a transistor. However, to obtain a greater reliability, this principle is advantageously exploited using a set of several transistors. Advantageously, this set is organized according to an architecture similar to that of a non-volatile electronic memory according to one embodiment.

Figure 3:
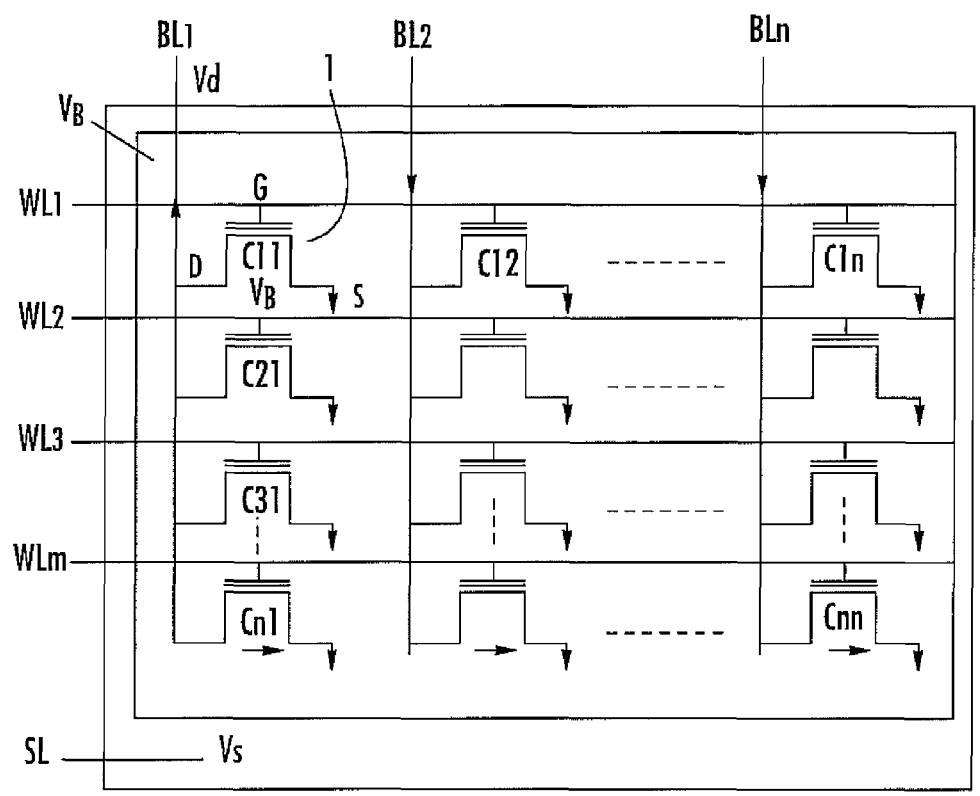
FIG. 3 is a schematic diagram of a set of transistors forming a receiving part of a light sensor according to one embodiment of the present invention.
Figure 4:
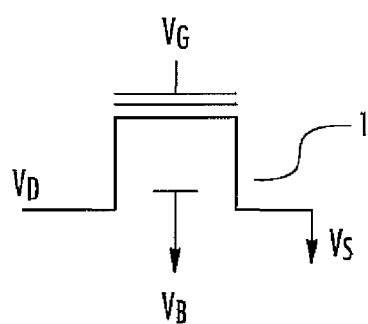
FIG. 4 is a schematic diagram of a transistor of FIG. 3 in a programming phase.

To this end, FIG. 3 illustrates such a set of transistors according to one embodiment. The transistors are arranged in m lines and n columns, a transistor 1 $C_{ij}$ as described above being located at the intersection of a word line $WL_i$ and of a bit line $BL_j$, to use the terminology used for non-volatile memories since the structure envisaged is almost identical. Each transistor $C_{ij}$ has its gate G connected to the word line $WL_i$ and its drain D connected to the bit line $BL_j$. Furthermore, all the transistors have their source S connected to the same source line SL.

The architecture described above makes it possible to implement an advantageous method for programming the set of transistors, in the manner of a non-volatile memory. For this, for a transistor to be programmed, it is, for example, proposed to set the potential $V_D$ of its drain D linked to a bit line to the value of 3.8 V, or more generally between 3.5 and 4.5 V, the potential of its source $V_S$ to 0 V, and the potential $V_B$ of its well (or substrate) to a negative value, for example −0.5 V, or broadly between 0 and −1.5 V, then the voltage of the control gate $V_G$ between 8 and 9 V inclusive. These electrical conditions allow a transistor 1 to switch from a non-programmed state to a programmed state. Naturally, the numerical values mentioned above are given by way of example. This programming method traps electrons in the selected transistor, as explained previously, according to the so-called "hot carriers" principle. As a variant, any other programming method inspired by the electronic memory programming methods, such as a Fowler-Nordheim-type programming, may be implemented.

Then, a reading method, similar to those used for a non-volatile memory, makes it possible to easily deduce therefrom the binary state, programmed or not, of each transistor of the set. For this, an appropriate read voltage is, for example, applied to a certain transistor. The result of this is an electric current or a voltage which depends on its programming state. By measuring this current or this voltage, a determination can be made as to whether the transistor has or has not been programmed. It is thus possible to collect, for each transistor in turn, or even by groups of transistors, the binary information indicating the state of all the transistors.

Figure 5:
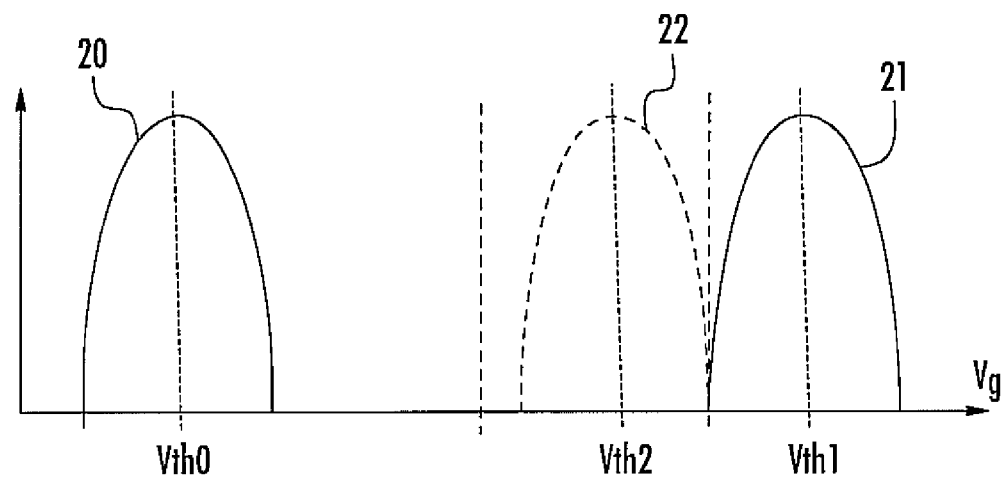
FIG. 5 is a graph of the statistical distribution of the voltage thresholds of transistors of a receiving part of a light sensor according to different states according to the embodiment of the present invention.

The two curves 20, 21 of the graph of FIG. 5 represent the statistical distribution of the threshold voltage values for all the transistors of the set described above, respectively in a non-programmed and a programmed state. It appears that these distributions form a Gaussian distributed around, respectively, the threshold voltage value $V_{th0}$ in the non-programmed state and $V_{th1}$ in the programmed state. These two Gaussians are sufficiently far apart to make it possible to reliably detect the state of the transistors, programmed or not.

By starting from a state in which all the transistors are initially in a programmed state, and by subjecting the set to a certain light radiation for a certain period, the transistors have their threshold voltage lowered, as has been explained previously. Thus, the distribution curve 22 illustrates an intermediate situation, after the reception of a certain amount of light, in which the transistors are distributed around a threshold voltage value $V_{th2}$ of between $V_{th0}$ and $V_{th1}$.

Thus, under the effect of a certain duration and/or a certain light intensity, an increasing number of transistors will finally achieve a non-programmed state. The curve 25 of the graph of FIG. 6 thus illustrates the number of transistors in the non-programmed state as a function of the period of exposure to a constant radiation. These transistors are placed in the programmed state at the initial instant. It clearly emerges that all the transistors progressively switch from the programmed state to the non-programmed state as a function of time. This change of state is easily detected by using the memory reading methods, as recalled previously. Thus, an advantageous embodiment includes itemizing, as a function of time, the number of transistors in the non-programmed state, to deduce therefrom an amount of UV radiation received. The same principle can be applied to detect a switch in the transistors to a predefined intermediate state of loss of charge. It is worth noting that this change of state of the sensor changes over time with the reception of the radiation, the effect of which is aggregated over time on the sensor, as long as it is not reset by a deliberate erasure operation.

Furthermore, a variant embodiment comprises a device for recovering the energy from the radiation, to generate an electric current which is sufficient to power the system for reading and/or programming and/or erasing the transistors of the sensor. According to another variant, the sensor comprises a non-illuminated telltale zone, to be able to deduce therefrom, the thermal effects, such as, temperature rises on the sensor.

Thus, the explanations above allow for the implementation of a light sensor, comprising a set of transistors as described above, positioned in a structure comprising a transparent window to subject the transistors to the incident light. This set forms a receiving part of the light sensor and may comprise any number of transistors. Also, the measurement of the amount of light uses transistor programming and reading operations, so as to control and manage their state, and a possible processing of the received data. For this, any hardware component and/or software can be used, keeping the components implemented in the context of non-volatile memories. This part fulfilling programming and reading functions can be implemented in the same structure as the part receiving the radiation, or, as a variant, in a separate device, which can enter into contact-based or contactless communication with this receiving part. Furthermore, this sensor or its external part comprises a human-machine interface to inform a user of the measurement made. This human-machine interface can take various forms. The simplest form indicates, for example, a predefined threshold of the amount of light has been exceeded, using an audible or visual alarm for example, and, as a variant, a more sophisticated screen can be used to indicate several levels of amount of light received.

Since the light receiving part is formed from a thin semiconductor substrate, the light sensor is advantageously combined with different products for which the sensitivity to light is high, to manage their trend, conservation, maintenance, etc., over time. For example, such a light measurement sensor may be arranged, fixed or removably, on the surface of a tube of sunscreen, on a beach towel, on clothing, etc. The sensor may be provided with a communication device, for example a wireless device, to communicate values to an external remote object, such as a telephone for example or a reading and analysis terminal, provided with a computer and a human-machine interface to convey a measurement result to a user. A system is thus provided which comprises a sensor measuring received light, arranged or not on a certain device, and a reader capable of communicating with the sensor so as to exchange data, and carry out a processing of the measurements made by the sensor.

The use of a set of transistors makes the measurement reliable because it is based on statistics from a sufficient number of transistors. This number is a trade-off between the reliability, the longevity, and the desired cost of the sensor. For example, for a disposable version, used just once with no possibility of reprogramming, of a light sensor, a number of transistors less than or equal to 1000, even less than or equal to 500 or to 100 may suffice. For a sensor that has to be used many times, any large number of transistors may be used, or, once again, a number less than or equal to 1000. Also, the sensor may be provided with its own electrical power supply for standalone operation, based on a battery or a solar power supply, from one or more photovoltaic cells.

Finally, the sensor may comprise an electronic memory for storing the measurement values, the results of the calculations. For this, the structure of this memory and of the part receiving light may be of the same type. These two elements are able to be fabricated simultaneously by the same method since the receiving part is based on an architecture similar to that of a non-volatile memory. The measurement sensor thus described can also be integrated in a chipcard, the unused standardized contacts of the chipcard then being used for the communication with the light measurement sensor.

The approach also relates to a method for measuring received light, or more generally any radiation of photons. According to one embodiment, this method comprises positioning a set of at least one transistor in a totally programmed state and monitoring the state of the transistors as a function of time to deduce therefrom an amount of light received based on their loss of charge.

The first step may include a first substep of erasure of all the transistors, that is to say, their switch to the non-programmed state, before the second substep of programming all the transistors. To implement these steps, any method for programming and/or reading a transistor may be implemented, without being limited to the examples described previously.

Figure 6:
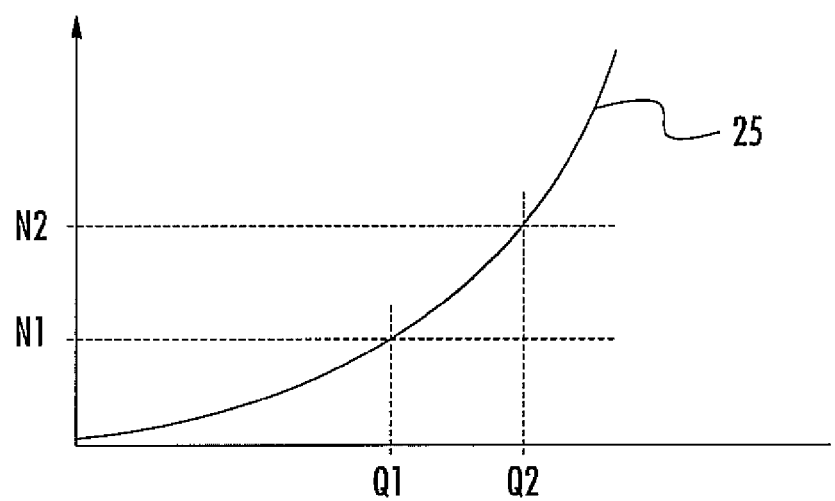
FIG. 6 is a graph of the number of transistors in the "non-programmed state" or erased state as a function of the exposure to the UV radiation of transistors of a receiving part of a light sensor according to the embodiment of the present invention.

The second step may include the following different variants. According to a first variant, it is possible to predefine one or more values N1, N2, etc., between 0 and N, where N is the number of transistors intended to receive the light from the sensor used, as illustrated in the graph of FIG. 6. Then, the method computes, at a given instant, the number of transistors that have switched to the non-programmed state or to a predefined intermediate state of loss of charge, and associates this number with one of the values N1, N2, etc., predefined to deduce therefrom the corresponding quantity of light Q1, Q2, etc., as illustrated in the graph of FIG. 6.

According to a second variant, it is possible to predefine one or more voltage values $V_{th2}$ between the threshold voltages $V_{th0}$ and $V_{th1}$ and to count the quantity of transistors for which the threshold voltage falls below a certain predefined value. Then, this quantity of transistors is associated with an amount of light. According to another variant, it is possible to measure another electrical quantity, such as, a current of at least one transistor to deduce the effect of the light radiation based on the trend over time of this quantity.

In these variants, the estimation of the light received based on the electrical analysis of the different transistors is, for example, obtained theoretically or empirically. For this, the method may comprise a preliminary step of calibration of the sensor, based on a photodiode used as a reference for example.

Naturally, the architecture represented in the different figures is by way of example and it is possible to imagine any other types of embodiments of such a light measurement sensor, based on any type of transistor and/or based on any arrangement of these transistors, according to the model of any type of non-volatile electronic memory, for example.

That which is claimed is:

1. A method for estimating radiation of photons comprising:
   programming a plurality of transistors arranged according to a non-volatile electronic memory structure;
   measuring, using a sensor, an electrical quantity of the plurality of transistors after receiving the radiation; and
   estimating, using the sensor an amount of radiation received based upon the electrical quantity by at least estimating a number of the plurality of transistors in at least one of an unprogrammed state and an intermediate state associated with a loss of charge.

2. The method according to claim 1, wherein the radiation comprises ultraviolet radiation.

3. The method according to claim 1, wherein measuring the electrical quantity comprises measuring a threshold voltage.

4. The method according to claim 1, wherein measuring the electrical quantity comprises measuring a current of each of the plurality of transistors.

5. The method according to claim 1, wherein the plurality of transistors is arranged in m lines and n columns, each of the plurality of transistors being located at an intersection of a word line and of a bit line, and having a gate coupled to the word line and a drain coupled to the bit line so that at least one of the programming and the measuring comprises applying a voltage to the gate via the word lines.

6. The method according to claim 1, wherein programming comprises programming all the plurality of transistors.

7. The method according to claim 1, further comprising performing a preliminary calibration.

8. The method according to claim 1, further comprising erasing all of the plurality of transistors configured to receive radiation by at least removing from the plurality of transistors, electric charge before recommencing a new estimation of the amount of radiation received.

9. The method according to claim 1, further comprising indicating the estimation of the amount of radiation via a human-machine interface.

10. The method according to claim 9 wherein the human-machine interface comprises at least one of a visual display and a sound emission.

11. The method according to claim 9, wherein indicating comprises indicating whether the estimated amount of radiation exceeds a threshold.

12. The method according to claim 9, wherein indicating comprises indicating at least one among a plurality of levels of the amount of radiation received.

13. A sensor for estimating radiation of photons comprising:
   a plurality of transistors arranged according to a non-volatile electronic memory structure and configured to receive the radiation; and
   a device configured to estimate the radiation by at least programming the plurality of transistors,
      measuring an electrical quantity of the plurality of transistors, and
      estimating an amount of the radiation received based upon the electrical quantity by at least estimating a number of the plurality of transistors in at least one of an unprogrammed state and an intermediate state associated with a loss of charge.

14. The sensor according to claim 13, wherein the radiation comprises ultraviolet radiation.

15. The sensor according to claim 13, further comprising at least one window adjacent said at least one transistor.

16. The sensor according to claim 13, wherein said plurality of transistors is configured in m lines and n columns, each of said plurality of transistors being located at the intersection of a word line and of a bit line, and having a gate coupled to the word line and a drain coupled to the bit line, so that at least one of programming and electrical quantity measurement comprises application of a voltage to the gate via the word lines.

17. The sensor according to claim 13, wherein said device is configured to at least one of program, read, and erase the at least one transistor.

18. The sensor according to claim 13, wherein said at least transistor has a floating gate and is configured to be programmed by injection of hot carriers.

19. The sensor according to claim 13, wherein said device comprises a human-machine interface configured to indicate the estimation of the amount of radiation received.

20. A system comprising:
   a sensor for estimating radiation of photons comprising
      plurality of transistors arranged according to a non-volatile electronic memory structure and configured to receive the radiation, and
      a device configured to estimate the radiation received by at least
         programming the plurality of transistors,
         measuring an electrical quantity of the plurality of transistor, and
         estimating an amount of the radiation received based upon the electrical quantity by at least estimating a number of the plurality of transistors in at least one of an unprogrammed state and an intermediate state associated with a loss of charge; and
   a reader configured to exchange data with said measurement sensor.

21. The system according to claim 20, wherein the radiation comprises ultraviolet radiation.

22. The system according to claim 20, wherein said sensor comprises at least one window adjacent said plurality of transistors.

23. The system according to claim 20, wherein said plurality of transistors is configured in m lines and n columns, each of said plurality of transistors being located at the intersection of a word line and of a bit line, and having a gate coupled to the word line and a drain coupled to the bit line, so that at least one of programming and electrical quantity measurement comprises application of a voltage to the gate via the word lines.

24. The system according to claim 20, wherein said device is configured to at least one of program, read, and erase the at least one transistor.

25. The system according to claim 20, wherein said plurality of transistors has a floating gate and is configured to be programmed by injection of hot carriers.

26. A method for estimating radiation of photons comprising:
    programming a plurality of transistors arranged according to a non-volatile electronic memory structure;
    measuring, using a sensor, a threshold voltage of each of the plurality of transistors after receiving the radiation; and
    estimating, using the sensor an amount of radiation received based upon the threshold voltages by at least estimating a shift in a statistical distribution of the threshold voltages.

27. The method according to claim 26, wherein the radiation comprises ultraviolet radiation.

28. The method according to claim 26, wherein the plurality of transistors is arranged in m lines and n columns, each of the plurality of transistors being located at an intersection of a word line and of a bit line, and having a gate coupled to the word line and a drain coupled to the bit line so that at least one of the programming and the measuring comprises applying a voltage to the gate via the word lines.

29. The method according to claim 26, wherein programming comprises programming all the plurality of transistors.

30. The method according to claim 26, further comprising performing a preliminary calibration.

31. The method according to claim 26, further comprising erasing all of the plurality of transistors configured to receive radiation by at least removing from the plurality of transistors, electric charge before recommencing a new estimation of the amount of radiation received.

32. The method according to claim 26, further comprising indicating the estimation of the amount of radiation via a human-machine interface.

33. A sensor for estimating radiation of photons comprising:
    a plurality of transistors arranged according to a non-volatile electronic memory structure and configured to receive the radiation; and
    a device configured to estimate the radiation by at least programming the plurality of transistors,
        measuring a threshold voltage of each of the plurality of transistors, and
        estimating an amount of the radiation received based upon the threshold voltages by at least estimating a shift in the statistical distribution of the threshold voltages.

34. The sensor according to claim 33, wherein the radiation comprises ultraviolet radiation.

35. The sensor according to claim 33, further comprising at least one window adjacent said at least one transistor.

36. The sensor according to claim 33, wherein said plurality of transistors is configured in m lines and n columns, each of said plurality of transistors being located at the intersection of a word line and of a bit line, and having a gate coupled to the word line and a drain coupled to the bit line, so that at least one of programming and the threshold voltage measurement comprises application of a voltage to the gate via the word lines.

37. The sensor according to claim 33, wherein said device is configured to at least one of program, read, and erase the plurality of transistors.

38. The sensor according to claim 33, wherein each of said plurality of transistors has a floating gate and is configured to be programmed by injection of hot carriers.

39. The sensor according to claim 33, wherein said device comprises a human-machine interface configured to indicate the estimation of the amount of radiation received.

* * * * *

UNITED STATES PATENT AND TRADEMARK OFFICE
CERTIFICATE OF CORRECTION

| | | |
|---|---|---|
| PATENT NO. | : 8,853,615 B2 | Page 1 of 1 |
| APPLICATION NO. | : 13/552787 | |
| DATED | : October 7, 2014 | |
| INVENTOR(S) | : Castellan et al. | |

It is certified that error appears in the above-identified patent and that said Letters Patent is hereby corrected as shown below:

In the Claims,

| | |
|---|---|
| Column 8, Lines 40-41 | Delete: "least transistor" |
| | Insert: --least one transistor-- |
| Column 8, Line 48 | Delete: "plurality of" |
| | Insert: --a plurality of-- |
| Column 8, Line 55 | Delete: "transistor" |
| | Insert: --transistors-- |

Signed and Sealed this
Seventh Day of July, 2015

Michelle K. Lee
*Director of the United States Patent and Trademark Office*